United States Patent
Kim (10) Patent No.: US 10,026,230 B2
(45) Date of Patent: Jul. 17, 2018

(54) AUGMENTED POINT CLOUD FOR A VISUALIZATION SYSTEM AND METHOD

(71) Applicant: DAQRI, LLC, Los Angeles, CA (US)

(72) Inventor: Byungsoo Kim, Palo Alto, CA (US)

(73) Assignee: DAQRI, LLC, Los Angeles, CA (US)

( * ) Notice: Subject to any disclaimer, the term of this patent is extended or adjusted under 35 U.S.C. 154(b) by 110 days.

(21) Appl. No.: 15/085,097

(22) Filed: Mar. 30, 2016

(65) Prior Publication Data

US 2017/0287216 A1    Oct. 5, 2017

(51) Int. Cl.
*G06T 15/00* (2011.01)
*G06T 19/00* (2011.01)
*H04L 29/08* (2006.01)

(52) U.S. Cl.
CPC ............ *G06T 19/006* (2013.01); *G06T 15/00* (2013.01); *H04L 67/1097* (2013.01); *G06T 2200/04* (2013.01)

(58) Field of Classification Search
None
See application file for complete search history.

(56) References Cited

U.S. PATENT DOCUMENTS

| | | | | |
|---|---|---|---|---|
| 8,442,307 B1 * | 5/2013 | Anati | ........................ | G06T 7/73 382/154 |
| 8,581,929 B1 * | 11/2013 | Maguire, Jr. | ........... | G06F 3/013 345/619 |
| 2001/0040573 A1 * | 11/2001 | Kressin | ................... | G06T 17/20 345/421 |
| 2002/0145607 A1 * | 10/2002 | Dimsdale | ............. | G01B 11/002 345/423 |
| 2003/0058242 A1 * | 3/2003 | Redlich | ................... | G06T 17/10 345/427 |
| 2009/0027412 A1 * | 1/2009 | Burley | .................... | G06T 15/04 345/582 |
| 2010/0020066 A1 * | 1/2010 | Dammann | .............. | G06T 19/00 345/419 |
| 2010/0094844 A1 * | 4/2010 | Cras | .................... | G06F 17/2785 707/705 |
| 2013/0155058 A1 * | 6/2013 | Golparvar-Fard | .... | G06T 19/006 345/419 |
| 2013/0215115 A1 * | 8/2013 | Jenkins | ................... | G06T 15/20 345/420 |

(Continued)

*Primary Examiner* — Martin Mushambo
(74) *Attorney, Agent, or Firm* — Schwegman Lundberg & Woessner, P.A.

(57) ABSTRACT

A visualization system that uses deep learning can store data representing a scene in multiple layers of representation. Each layer can include a different category of data from the other layers. The categories of data can increase in complexity and specificity from a lowermost layer to an uppermost layer. For instance, first, second, and third layers can store information corresponding to edges, corners, and surface finishes present in the scene, respectively. The visualization system can retrieve data representing the scene from multiple layers, and augment a point cloud representation of the scene in response to the retrieved data. The point cloud can be augmented to increase a point density in one or more point cloud regions that lack data or include only sparse data. Downstream, the visualization system can use the augmented point cloud to create improved images of the scene from desired points of view.

19 Claims, 10 Drawing Sheets

(56) References Cited

U.S. PATENT DOCUMENTS

2015/0062120 A1\* 3/2015 Reisner-Kollmann ............................ G06T 19/006 345/419
2016/0148433 A1\* 5/2016 Petrovskaya ......... G06T 19/006 345/633

\* cited by examiner

AUGMENTED POINT CLOUD FOR A VISUALIZATION SYSTEM AND METHOD

TECHNICAL FIELD

The subject matter disclosed herein generally relates to image processing. Specifically, the present disclosure addresses augmenting a point cloud in a visualization system and method and thereby improving images formed from the point cloud.

BACKGROUND

A system can capture images of a scene, and can use the captured images to form a three-dimensional model of the scene. In some examples, the three-dimensional model of the scene can be stored as data in a point cloud. The point cloud can include a set of data points representing locations in a three dimensional coordinate system. In some examples, the data points can include color information, as well as location information. Display devices can retrieve data from the point cloud and render realistic images of the scene from the retrieved data.

BRIEF DESCRIPTION OF THE DRAWINGS

Some embodiments are illustrated by way of example and not limitation in the figures of the accompanying drawings.

DETAILED DESCRIPTION

There is ongoing effort to improve the accuracy and resolution of the data in the point cloud. For example, there is ongoing effort to fill in missing data points in the point cloud. Such missing data points can arise from one element of the scene occludes another element of the scene, so that image data representing the occluded portion may be limited or absent. As the accuracy and resolution of data in the point cloud improve, the rendered images of the scene can increase in realism and resolution.

Figure 1:
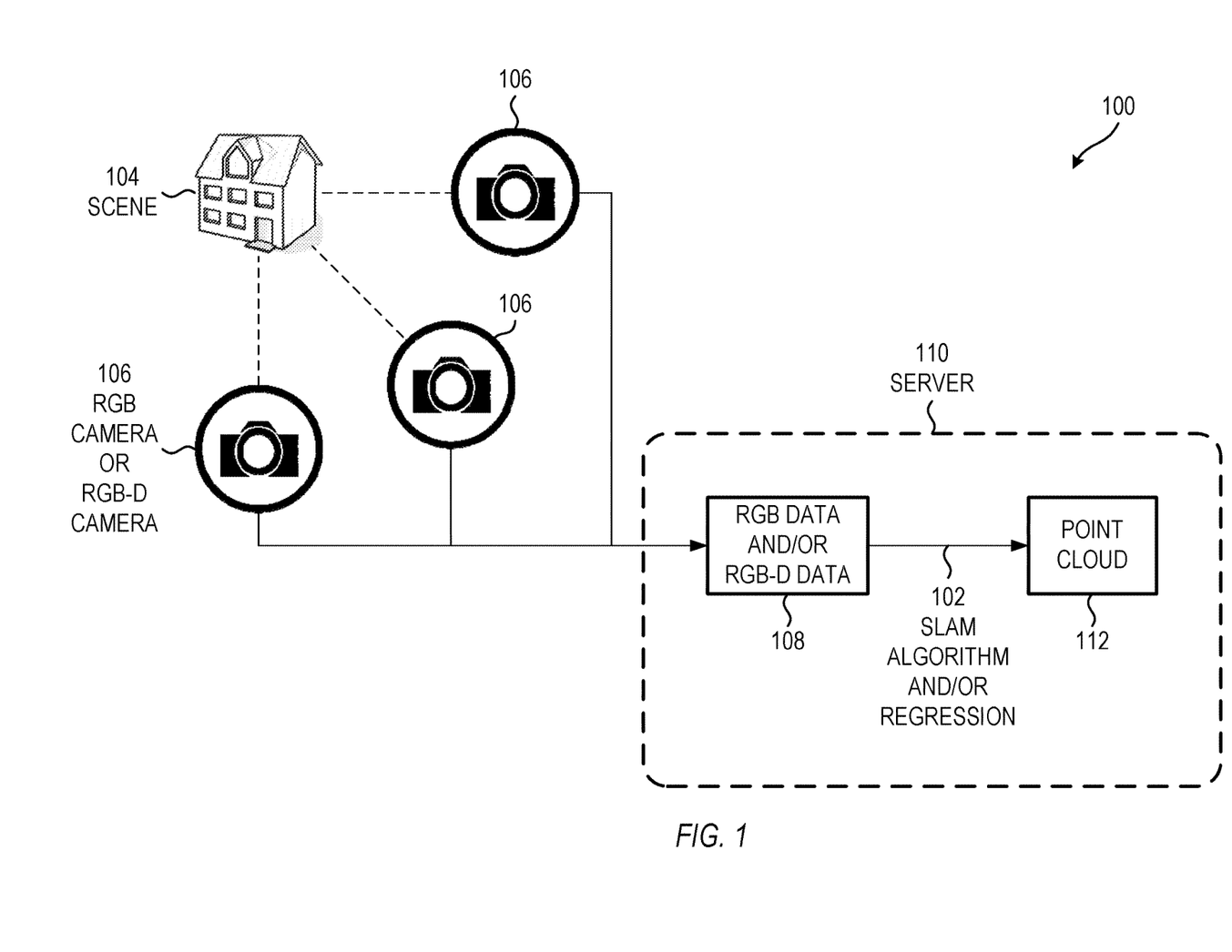
FIG. 1 is a block diagram showing an example of a visualization system, in accordance with some embodiments.

FIG. 1 is a block diagram showing an example of a visualization system 100, in accordance with some embodiments. The configuration of FIG. 1 is but one example; other suitable examples can also be used.

Figure 8:
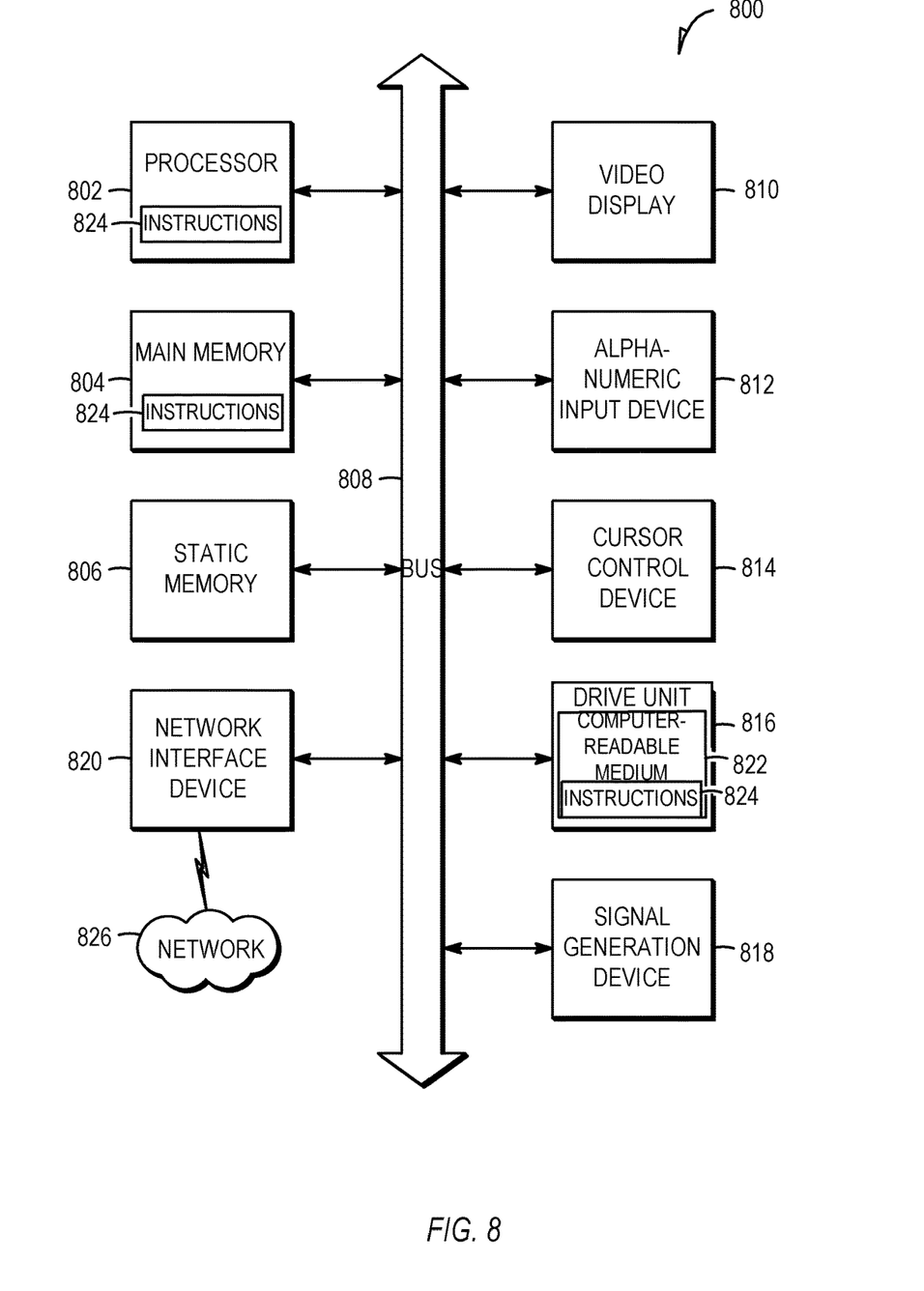
FIG. 8 is a block diagram showing components of an example of a machine, in accordance with some embodiments.

The visualization system 100 can use a Simultaneous Localization and Mapping (SLAM) algorithm 102 to create a model of a scene 104, such as a room or a city block, from image data obtained from one or more cameras 106, from one or more images taken of the scene 104. The one or more cameras 106 can be moved to capture images of portions of the scene 104 from different locations and/or different angles. The cameras can generate red, green, and blue (RGB) data 108 for each pixel in each image. The cameras can also optionally generate depth data 108 for each pixel in the image (RGB-D). A server 110 can compile the RGB data 108 or RGB-D data 108 to form a point cloud 112 that represents locations of the scene 104 in a three dimensional coordinate system. FIG. 8 below and its accompanying text provide an example of a suitable architecture for a server 110.

In a specific example of a known SLAM system, a car equipped with multiple cameras aimed in different directions can drive down a street, can capture images from each camera at multiple locations along the street, and can upload the captured images to a server. A server can use a SLAM algorithm to form a point cloud from the uploaded images. This is but one example; other suitable examples can also be used.

Figure 2:
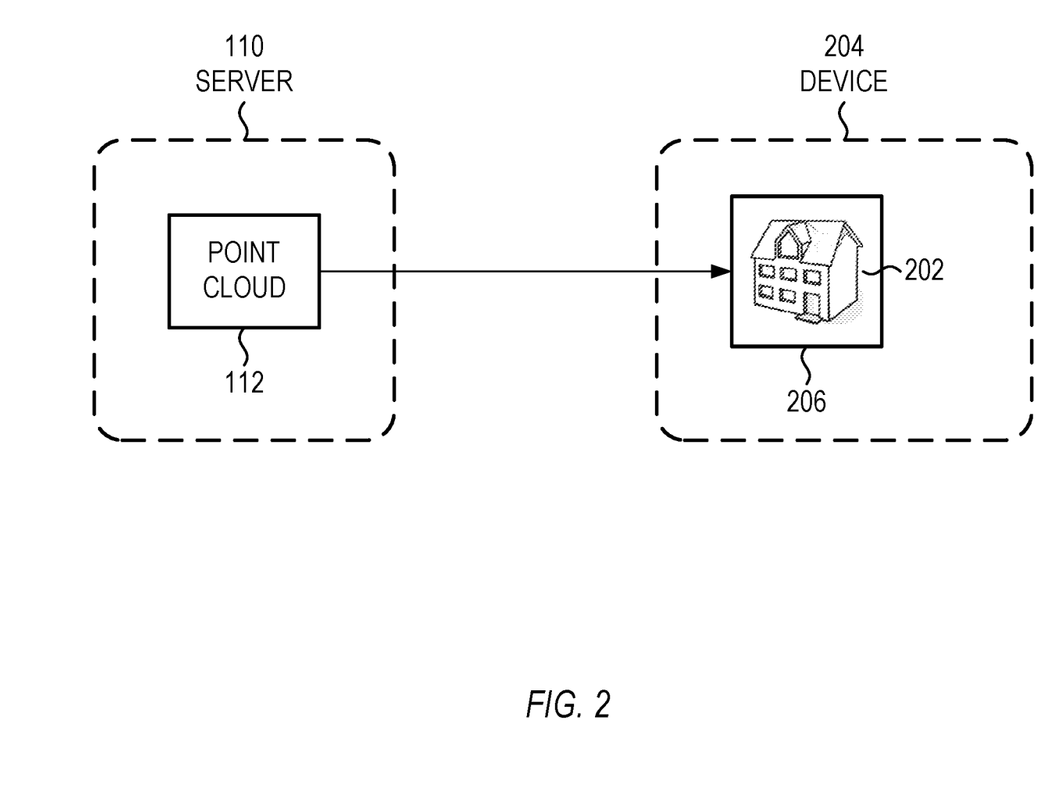
FIG. 2 is a block diagram showing an example of another aspect of the visualization system of FIG. 1, in accordance with some embodiments.

FIG. 2 is a block diagram showing an example of another aspect of the visualization system 100 of FIG. 1, in accordance with some embodiments. The configuration of FIG. 2 is but one example; other suitable examples can also be used.

Figure 9:
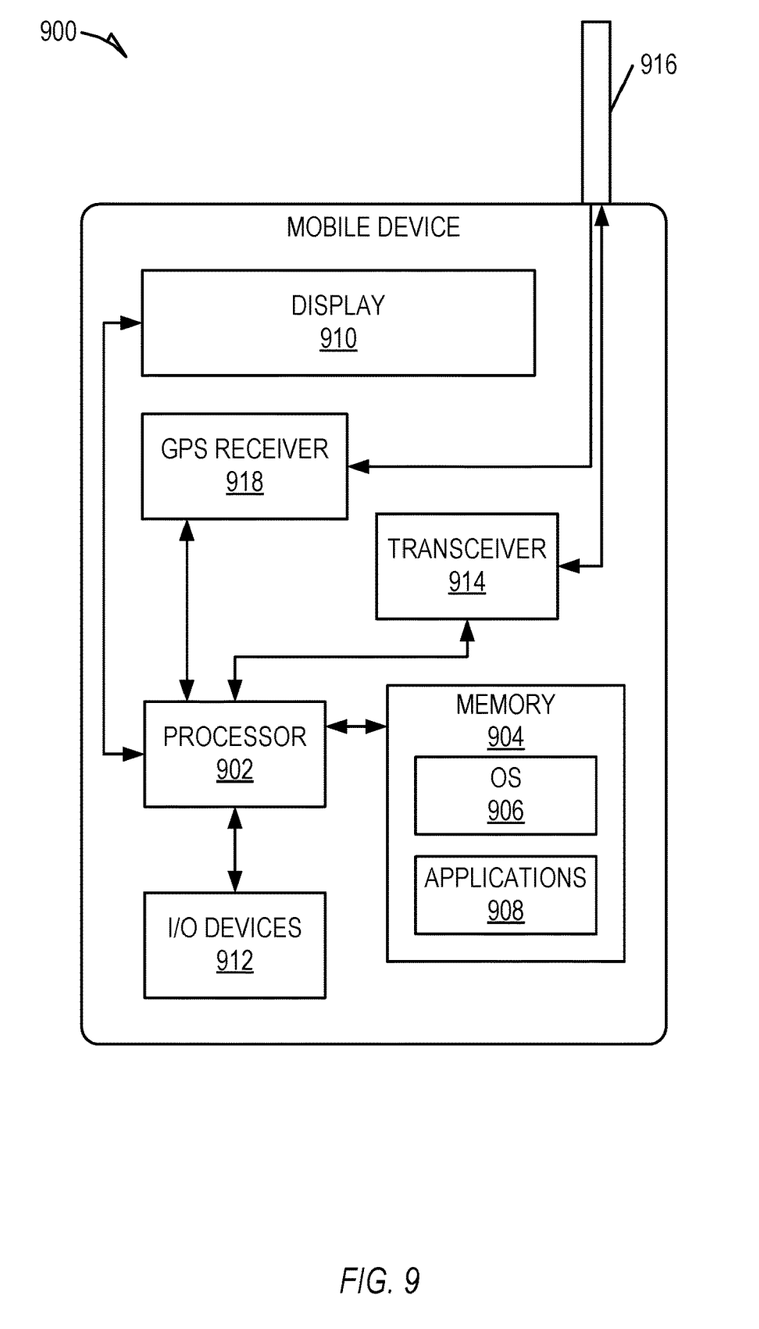
FIG. 9 is a block diagram showing a mobile device, in accordance with some embodiments.

Downstream, the visualization system 100 can use the point cloud 112 to create a visualization 202 of the scene 104 (FIG. 1). For example, a device 204, such as a virtual reality headset, a mobile device, a smart phone, a laptop computer, or a tablet computer, can retrieve data from the point cloud 112, can use the retrieved data to form one or more dynamic images of the scene from any desired point of view and any desired gaze direction, and can display the formed image(s) on a display 206. FIG. 9 below and its accompanying text provide a suitable architecture for a mobile device. It is desirable to have a relatively dense point cloud 112, which will desirably allow the visualization to have a relatively high resolution.

In some cases, the one or more cameras may not be able to fully capture the full geometry of the scene. As a specific example, in which the scene is a kitchen with a table and chairs, a chair may be tucked under a table. From the point of view of one or more cameras that image the scene from one or more points of view in and/or near the kitchen, the table may block or occlude a portion of a leg of the chair. For this specific example, a typical SLAM algorithm operating on the images may produce an incomplete point cloud. Such an incomplete point cloud may lack data in the region of the occluded portion of the chair leg. For this case, and other cases in which the geometry of the scene is not fully captured, it would be desirable to fill or fix any holes or other deficiencies in the point cloud.

In some cases, the point cloud can include imperfections. For instance, if the camera or cameras lack depth information (e.g., only provide RGB data), the point cloud can be relatively coarse, with data points that can be relatively far from one another. The relatively coarse point cloud can lack a mesh that connects the data points. Such a relatively coarse point cloud may lack the detail required to render high-resolution images of the scene. As another example, the camera or cameras can include imperfect optics, which can produce registration errors that can undesirably shift locations of one or more data points within the point cloud. As still another example, the camera or cameras may have missed one or more locations in the scene, leaving one or more holes in the point cloud. As still another example, one object in the scene may occlude another object in the scene, also leaving one or more holes in the point cloud. For these or any other examples, it would be desirable to fill or fix any holes or other deficiencies in the point cloud.

To fill or fix any holes or other deficiencies in the point cloud, a system can learn a pattern of data points in the point cloud that surround the missing point(s) in the data cloud, can guess what the missing point(s) would look like based on the learned pattern, and can add and/or replace points in the data cloud based on the guess. For the specific example, the case in which the table blocks a portion of the leg of a chair, the system can learn what a chair leg looks like. The system can learn properties of chair legs, such as taper and shape, orientation with respect to a seat of the chair and the other chair legs, color, surface finish, and so forth. Based on data points in the point cloud that correspond to locations above and locations below the occluded portion of the chair leg, the system can add and/or replace points in the occluded portion. The new and/or replaced points in the point cloud are not merely interpolations between the non-occluded locations of the chair leg, such as three-dimensional primitives (two-dimensional planes in three dimensions, three-dimensional ellipsoids, and so forth). Instead, the new and/or replaced points in the point cloud can include learned properties of chair legs, such as taper, shape, surface finish, and so forth.

As a very specific example, the system can capture images that show three of the four legs of the chair, but occlude a portion of the fourth leg. The captured images show that the three legs include particular a decorative feature, such as a carved pattern, at a specified height off the floor. A portion of the fourth leg is occluded by the geometry of the table and chair, so that the carved pattern on the fourth leg is not present in the captured images. The system can use a SLAM algorithm to generate a point cloud corresponding to the chair. Such a point cloud can lack data points in the region of the occluded fourth leg. The system can to fill in the missing data points that correspond to the occluded portion of the fourth leg. Based on the data corresponding to the three viewable legs, the system can learn that the legs on the chair include carved patterns at the specified height. When the system adds and/or replaces data points in the point cloud that correspond to the occluded portion of the fourth leg, the system can further add the carved pattern to the fourth leg at the specified height, even though locations on the fourth leg above or below the specified height do not have such a carved pattern. Such a carved pattern would not be present if the system used only interpolations between the non-occluded locations of the fourth leg.

Such a system can use a deep learning framework to learn one or more patterns, which can be used to fill or fix any holes or other deficiencies in the point cloud. Extracting the pattern or patterns from the color and shape information (RGB data or RGB-D data) can be referred to as training, or training the system. Training can require significant computing power, and can be executed on a server or a workstation.

Figure 3:
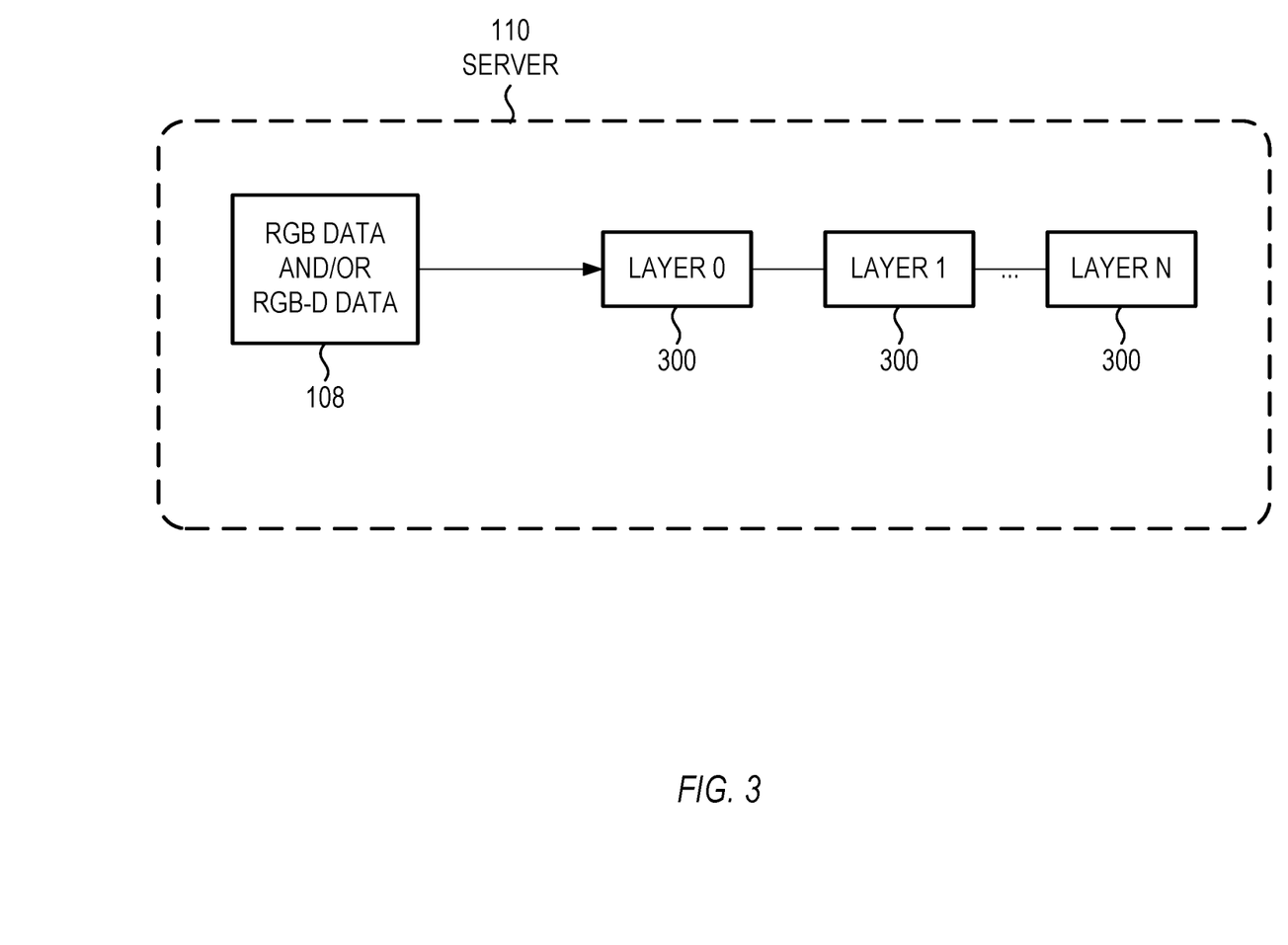
FIG. 3 is a block diagram showing an example of how data representing a scene can be stored in multiple layers of representation at a server, in accordance with some embodiments.

FIG. 3 is a block diagram showing an example of how data representing a scene can be stored in multiple layers 300 of representation at a server, in accordance with some embodiments. The configuration of FIG. 3 is but one example; other suitable examples can also be used.

The visualization system can use a class of machine learning algorithms known as deep learning. Using deep learning, the data representing a scene can be stored in multiple layers 300 of representation. In some examples, the system can determine how to allocate the layers, and what properties are represented by each layer. In general, lower layers (e.g., layers 0 and 1) can include relatively simple shape and color information, and higher layers (e.g., layer N) can include more complex contextual information, with the type of information increasing in complexity and/or specificity from the lower layers to the upper layers.

In the example of the table and chair discussed above, a first layer can store information corresponding to edges of the chair and RGB color information. A second layer can store information corresponding to corners of the chair. A third layer can store information corresponding to surface finish of the chair. A fourth layer can store information corresponding to a number of legs on the chair (four, in this example). A fifth layer can store information corresponding to particular properties of each leg, such as taper and shape. A sixth layer can store information corresponding to the carved pattern. This is but one example; other examples can also be used.

The visualization system can augment the point cloud, by filling or fixing holes, imperfections, and/or corrupted data in the point cloud, in a process referred to as testing. In general, testing can require less computational power than training, and can run on devices having less computational power than a server or a workstation, such as a mobile device, such as a smart phone or a tablet. In other examples, testing can also run on a server or a workstation.

In some examples, testing can include determining that a particular location (e.g., a three-dimensional location) in the point cloud includes corrupt or missing data. To fill in the missing data and/or fix the corrupt data, the visualization system can perform a process referred to as activation. For example, the system can activate a particular location in the point cloud.

Figure 4:
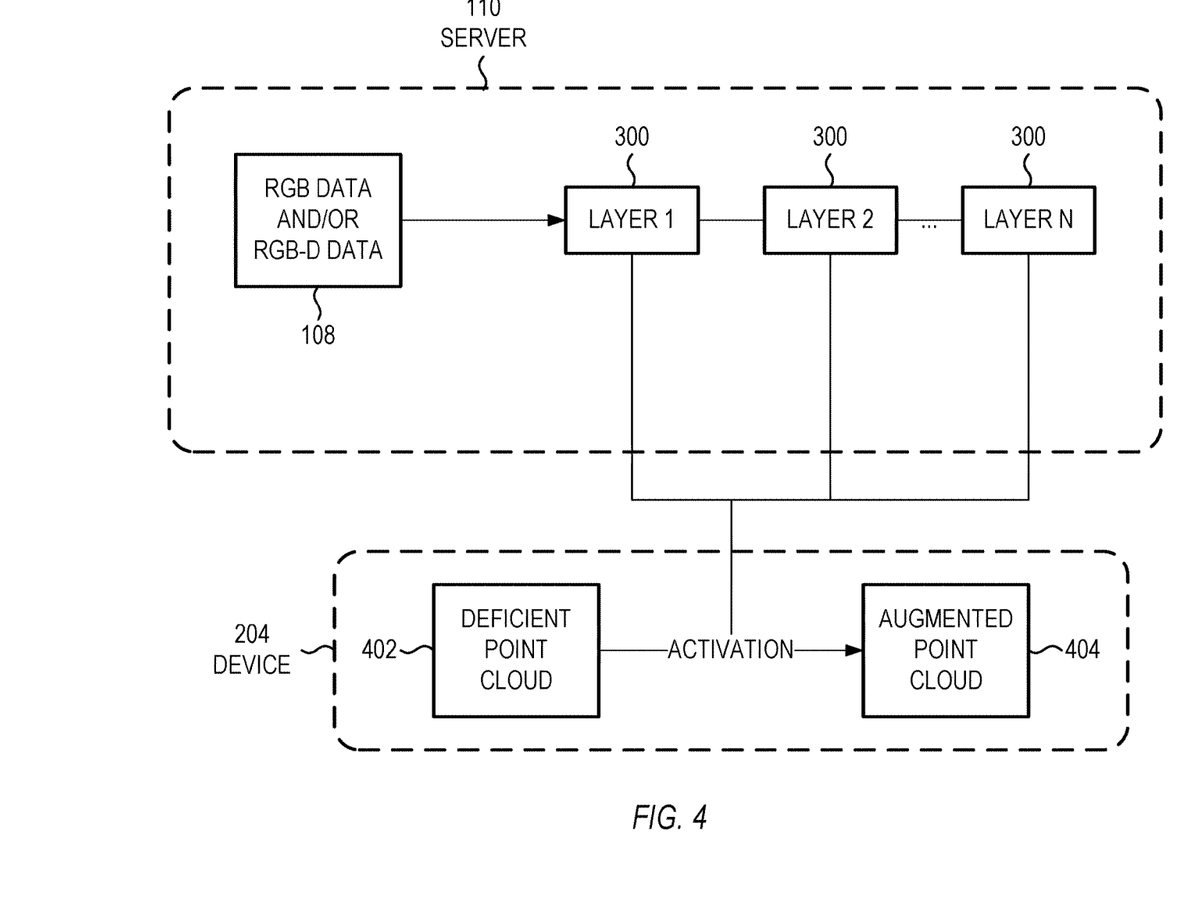
FIG. 4 is a block diagram showing an example of how activation can retrieve data from multiple layers to augment a deficient point cloud, in accordance with some embodiments.

FIG. 4 is a block diagram showing an example of how activation can retrieve data from multiple layers to augment a deficient point cloud, in accordance with some embodiments. In this example, the visualization system can implement testing to identify one or more deficient regions in the point cloud, then implement activation to augment each of these deficient regions. Activation can augment the point cloud by adding one or more points, and/or by filling or fixing one or more points in the point cloud. As such, activation transforms a deficient point cloud 402 into an augmented point cloud 404. The configuration of FIG. 4 is but one example; other suitable examples can also be used.

During activation, the visualization system retrieves data from multiple layers to generate new points in the point cloud, and/or fix or modify existing points in the point cloud. For example, in the table and chair example discussed above, the system can activate points that correspond to the occluded portion of the fourth leg of the chair. In this example, the system can retrieve edge data from the first layer, corner data from the second layer, surface finish data from the third layer, knowledge that the chair includes four legs from the fourth layer, taper and shape data from the fifth layer, and information about the carved pattern from the sixth layer can store information corresponding to the carved pattern. This is but one example; other examples can also be used. The visualization system can combine data from some or all of these layers to generate new points in the point cloud, and/or fix or modify existing points in the point cloud.

In this manner, activation can convert data from the various layers into a more familiar-looking form that can be recognizable in images generated downstream by the visualization system. In the table and chair example discussed above, the data stored in the layers may be difficult for a human to interpret. Activation can convert such data into a form that human can easily understand, such as a visualization of a fourth chair leg, which includes the carved pattern of the other three legs.

Augmenting or modifying point cloud points in this manner is an improvement over merely using three-dimensional primitives (two-dimensional planes in three dimensions, three-dimensional ellipsoids, and so forth) to fill in the space between sparse points in the point cloud. For example, the three-dimensional primitives would not be able to provide the carved pattern in the occluded portion of the fourth chair leg, and would instead interpolate between the sparse points.

In some examples, a mobile device, such as an augmented reality device or a virtual reality device, can update a point cloud. In some examples, the mobile device can accumulate data for each image frame. In other examples, the mobile device can accumulate data for a block of frames, such as between ten and fifteen frames. In some examples, the mobile device can use the accumulated data to augment a point cloud.

In some examples, when the mobile device uploads depth-deficient input to a server, the server can calculate a visual similarity between the depth-deficient input and its learned shapes. The server can perform such a calculation for each layer. Through activation of each layer, the server can use the visual similarity calculation(s) to synthesize an ideal image/point cloud. The server can send the synthesized image/point cloud to the mobile device. The mobile device can use the synthesized image/point cloud to replace the depth-deficient data where application, such as for missing holes in the point cloud or imperfect regions in the point cloud.

Figure 5:
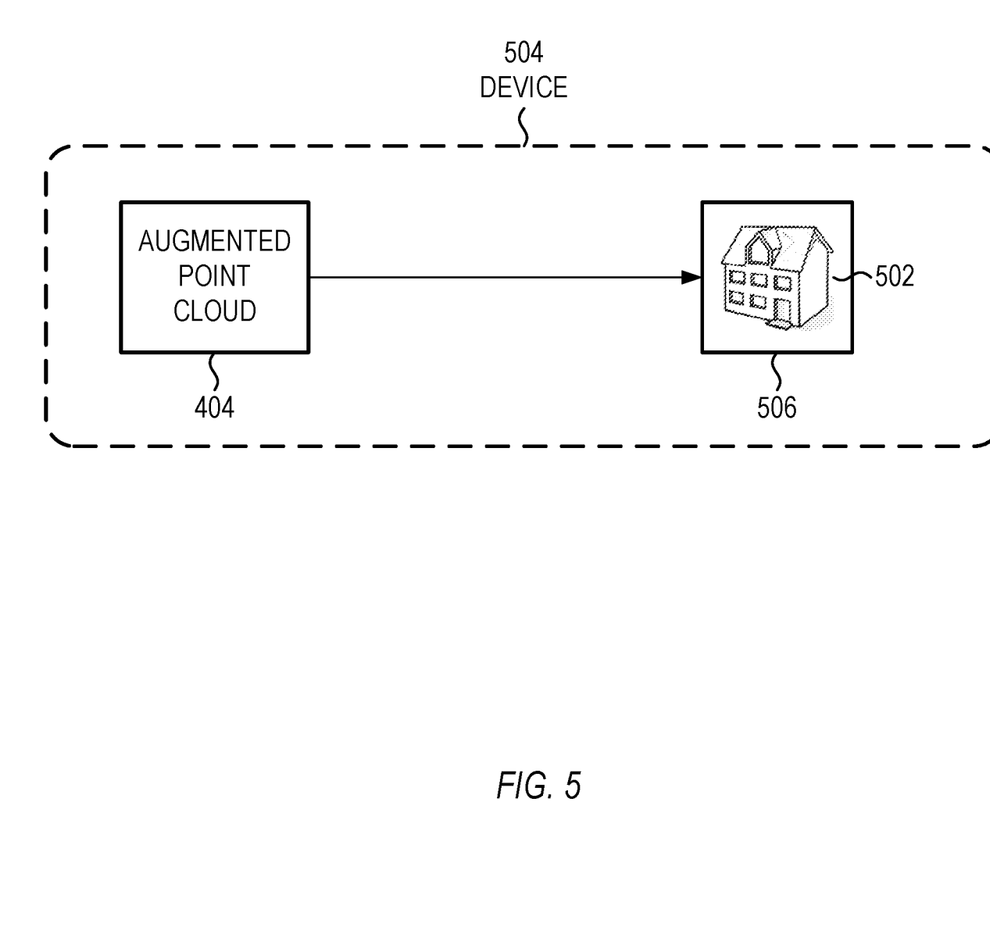
FIG. 5 is a block diagram showing an example of a device configured to form an image of the scene from the augmented point cloud, in accordance with some embodiments.

FIG. 5 is a block diagram showing an example of a device 504, such as a virtual reality headset, a mobile device, a smart phone, a laptop computer, or a tablet computer, configured to form an image 502 of the scene 104 (FIG. 1) from the augmented point cloud 112, in accordance with some embodiments. The configuration of FIG. 5 is but one example; other suitable configurations can also be used.

The device 504 can be further configured to display the image 502 on a display 506. In some examples, the image is a static image. In other examples, the image is a video image. The video image can be dynamically recalculated from a dynamically time-varying point of view and/or a dynamically varying gaze direction. Generating the image 502 from the augmented point cloud 112 is desirable, because such an image can include finer detail in the region of augmentation than if the image 502 were calculated from the deficient point cloud 402 (e.g., the point cloud before testing or activation).

Figure 6:
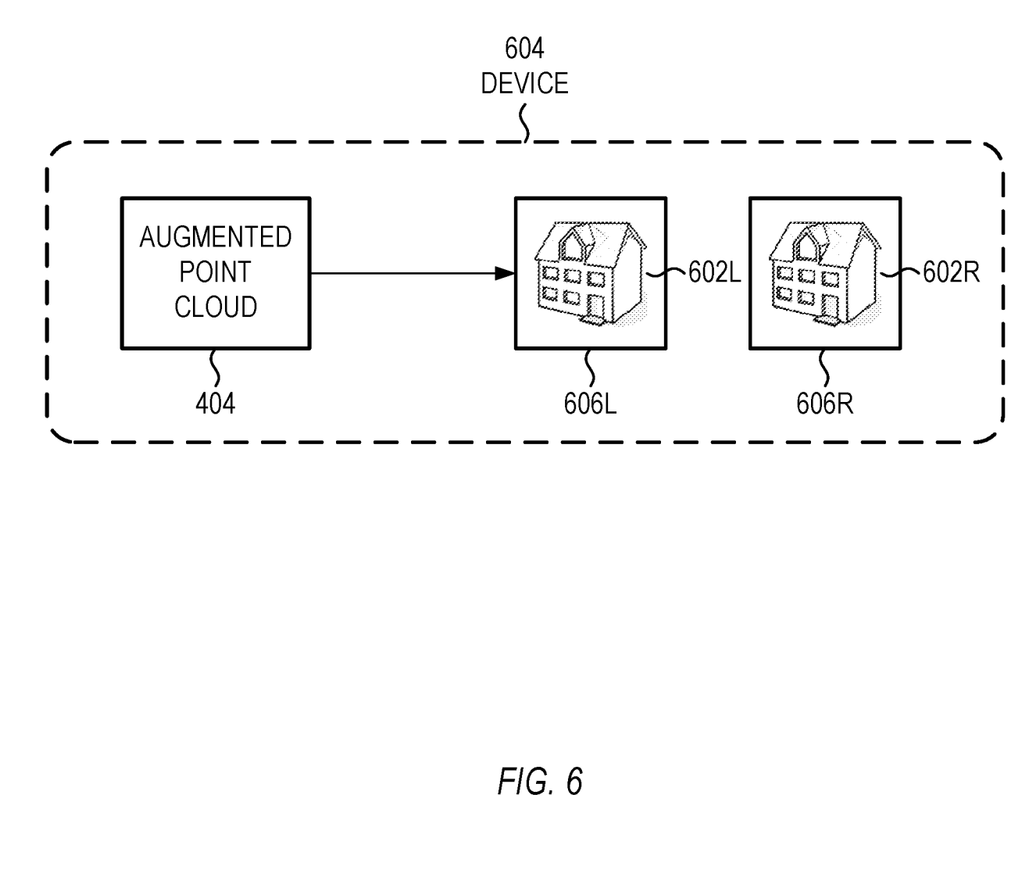
FIG. 6 is a block diagram showing an example of a device configured to simultaneously generate a left image of the scene and a right image of the scene, display the left image on a left display, and display the right image on a right display, in accordance with some embodiments.

FIG. 6 is a block diagram showing an example of a device 604, such as a wearable headset, configured to simultaneously generate a left image 602L of the scene and a right image 602R of the scene, display the left image 602L on a left display 606L, and display the right image 602R on a right display 606R, in accordance with some embodiments. The left image 602L and the right image 602R can have respective points of view separated by an interpupillary distance, so that the view of the scene presented to a viewer can appear three-dimensional. The interpupillary distance of the device can optionally be adjustable, to fit the eye geometry of a particular wearer.

Figure 7:
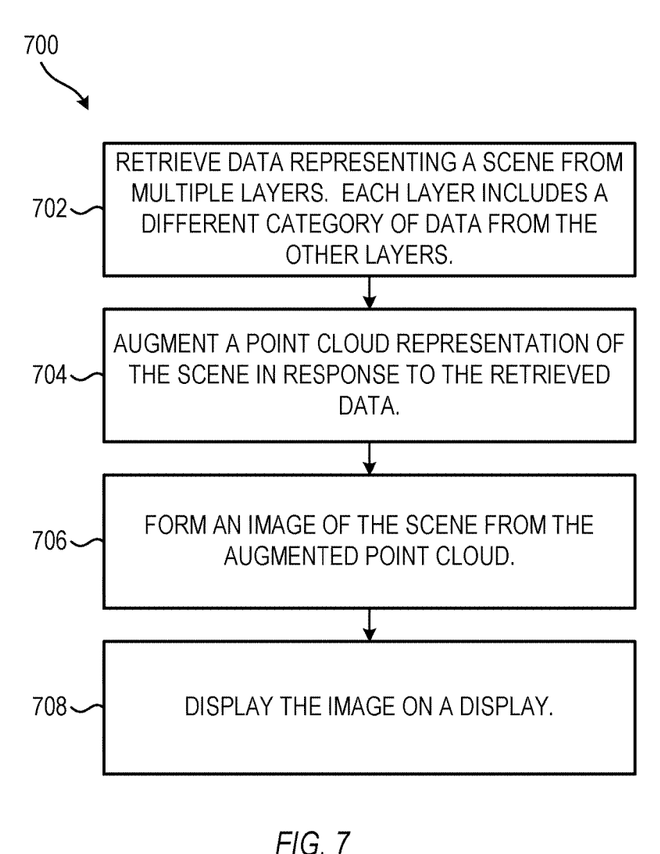
FIG. 7 is a flow chart showing an example of a method for augmenting a point cloud, in accordance with some embodiments.

FIG. 7 is a flow chart showing an example of a method 700 for augmenting a point cloud, in accordance with some embodiments. The method 700 can be executed on a device connectable to a visualization system, such as a virtual reality headset, a mobile device, a smart phone, a laptop computer, or a tablet computer. The method 700 is but one example; other methods can also be used.

At operation 702, the device can retrieve, from a server, data representing a scene from multiple layers. Each layer can include a different category or group of data from the other layers. In some examples, the categories of data increase in complexity and specificity from a lowermost layer to an uppermost layer. In some examples, the lowermost layer can be a first layer, which can store information corresponding to edges present in the scene. In some examples, a second layer, above the first layer, can store information corresponding to corners present in the scene. In some examples, a third layer, above the second layer, can store information corresponding to surface finish present in the scene. In some examples, retrieving the data representing the scene can include wirelessly connecting to a server. In some examples, retrieving the data representing the scene can further include retrieving the data representing the scene from a non-transitory data storage device communicatively coupled to the server.

At operation 704, the device can augment a point cloud representation of the scene in response to the retrieved data. In some examples, augmenting the point cloud representation of the scene can include filling in or fixing at least one hole in the point cloud.

At operation 706, the device can form an image of the scene from the augmented point cloud.

At operation 708, the device can display the image on a display. In some examples, the image is a still image. In other examples, the video is a video image. In some examples, the image is displayed on a single display. In other examples, the device can simultaneously form left and right images of the scene, and display the left and right images on respective left and right displays. In some examples, the left and right images can have respective points of view separated by an interpupillary distance.

FIG. 8 is a block diagram showing components of an example of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer system (e.g., a computer) within which the instructions 824 (e.g., software, a program, an application, an applet, an app, or other executable code) for causing the machine 800 to perform any one or more of the methodologies discussed herein may be executed, in whole or in part.

In alternative embodiments, the machine 800 operates as a standalone device or may be communicatively coupled (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine 800 capable of executing the instructions 824, sequentially or otherwise, that specify actions to be taken by that machine 800. Further, while only a single machine 800 is illustrated, the term "machine" shall also be taken to include any collection of machines 800 that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 contains solid-state digital microcircuits (e.g., electronic, optical, or both) that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein. In some example embodiments, the processor 802 is a multicore CPU (e.g., a dual-core CPU, a quad-core CPU, or a 128-core CPU) within which each of multiple cores behaves as a separate processor 802 that is able to perform any one or more of the methodologies discussed herein, in whole or in part. Although the beneficial effects described herein may be provided by the machine 800 with at least the processor 802, these same beneficial effects may be provided by a different kind of machine that contains no processors 802 (e.g., a purely mechanical system, a purely hydraulic system, or a hybrid mechanical-hydraulic system), if such a processor-less machine 800 is configured to perform one or more of the methodologies described herein.

The machine 800 may further include a video display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a drive unit 816, an signal generation device 818 (e.g., a sound card, an amplifier, a speaker, a headphone jack, or any suitable combination thereof), and a network interface device 820.

The drive unit 816 (e.g., a data storage device) includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media 822 (e.g., tangible and non-transitory machine-readable media). The instructions 824 may be transmitted or received over the network 826 via the network interface device 820. For example, the network interface device 820 may communicate the instructions 824 using any one or more transfer protocols (e.g., hypertext transfer protocol (HTTP)).

In some example embodiments, the machine 800 may be a portable computing device (e.g., a smart phone, tablet computer, or a wearable device), and have one or more additional input components 830 (e.g., sensors or gauges). Examples of such input components 830 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components 830 may be accessible and available for use by any of the modules described herein.

As used herein, the term "memory" refers to a machine-readable medium 822 able to store data temporarily or permanently and may be taken to include, but not be limited to, random-access memory (RAM), read-only memory (ROM), buffer memory, flash memory, and cache memory. While the machine-readable medium 822 is shown, in an example embodiment, to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 824 for execution by the machine 800 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 824).

FIG. 9 is a block diagram showing a mobile device 900, in accordance with some embodiments. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 may be adapted to store an operating system (OS) 906, as well as application programs 908, such as a mobile location enabled application that may provide LBSs to a user. In some examples the application program 908 can include a point cloud augmentation application, which can retrieve data stored in the multiple layers and augment a stored point cloud. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Figure 10:
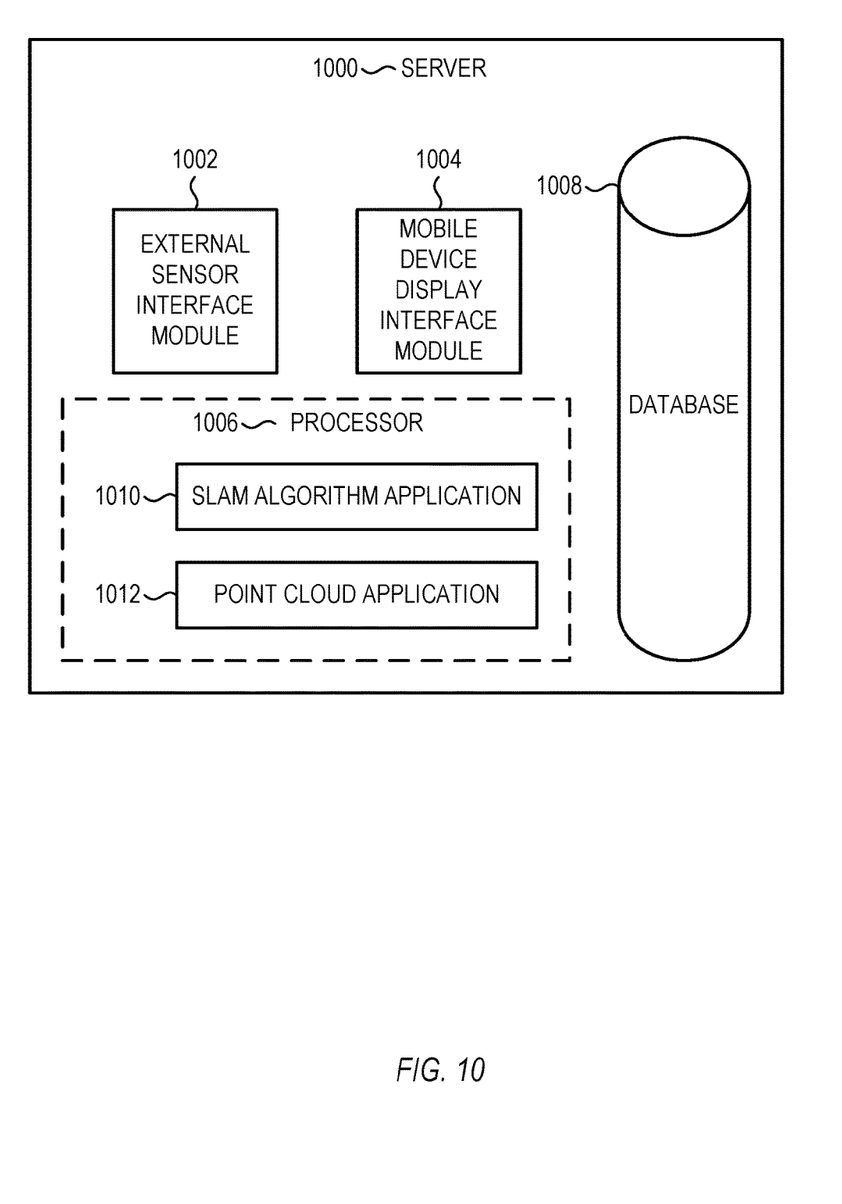
FIG. 10 is a block diagram illustrating an example embodiment of a server, in accordance with some embodiments.

FIG. 10 is a block diagram illustrating an example embodiment of a server 1000, in accordance with some embodiments. The server 1000 includes an external sensor interface module 1002, a mobile device display interface module 1004, a processor 1006, and a database 1008.

The external sensor interface module 1002 is configured to communicate with external sensors to receive sensor data related to one or more mobile devices and the scene. For example, the external sensor interface module 1002 can determine locations of mobile devices and the scene, distances between mobile devices and the scene, and the relative orientation between the mobile devices and the scene. The external sensor interface module 1002 can further determine data related to the scene.

The mobile device display interface module 1004 can be configured to communicate with the mobile devices located at the different locations around the scene. The mobile device display interface module 1004 can receives video and location data from the mobile devices to generate a reconstruction of a real-time 3D model of the scene.

The processor 1006 can execute a SLAM algorithm application 1010 that forms a point cloud from uploaded images. The processor 1006 can execute a point cloud application 1012 that maintains the point cloud, and updates and augments the point cloud as needed. In addition, in some examples, information from the model can be stored in multiple layers, as shown in FIG. 3 above.

Certain example embodiments are described herein as including modules. Modules may constitute software modules (e.g., code stored or otherwise embodied in a machine-readable medium 822 or in a transmission medium), hardware modules, or any suitable combination thereof. A "hardware module" is a tangible (e.g., non-transitory) physical component (e.g., a set of one or more processors 902) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor 902. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors 902, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory 904 (e.g., a memory device) to which it is communicatively coupled. A further hardware module may then, at a later time, access the memory 904 to retrieve and process the stored output. Hardware modules may also initiate communications with input or output devices, and can operate on a resource (e.g., a collection of information from a computing resource).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions described herein. As used herein, "processor-implemented module" refers to a hardware module in which the hardware includes one or more processors 902. Accordingly, the operations described herein may be at least partially processor-implemented, hardware-implemented, or both, since a processor 902 is an example of hardware, and at least some operations within any one or more of the methods discussed herein may be performed by one or more processor-implemented modules, hardware-implemented modules, or any suitable combination thereof.

Moreover, such one or more processors 902 may perform operations in a "cloud computing" environment or as a service (e.g., within a "software as a service" (SaaS) implementation). For example, at least some operations within any one or more of the methods discussed herein may be performed by a group of computers (e.g., as examples of machines 800 that include processors 902), with these operations being accessible via a network 826 (e.g., the Internet) and via one or more appropriate interfaces (e.g., an application program interface (API)). The performance of certain operations may be distributed among the one or more processors 902, whether residing only within a single machine 800 or deployed across a number of machines 800. In some example embodiments, the one or more processors 902 or hardware modules (e.g., processor-implemented modules) may be located in a single geographic location (e.g., within a home environment, an office environment, or a server farm). In other example embodiments, the one or more processors 902 or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory 904 (e.g., a computer memory 904 or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 800. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine 800 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A device, comprising:
   at least one processor; and
   memory including instructions that, when executed on the at least one processor, cause the at least one processor to perform operations, the operations comprising:
      retrieving, from a server, data representing a scene from multiple layers, each layer including a different category of data from the other layers, the categories of data increasing in complexity and specificity from a lowermost layer to an uppermost layer; and
      augmenting a point cloud representation of the scene in response to the retrieved data.

2. The device of claim 1, wherein the lowermost layer is a first layer, the first layer storing information corresponding to edges present in the scene.

3. The device of claim 2, wherein a second layer, above the first layer, stores information corresponding to corners present in the scene.

4. The device of claim 3, wherein a third layer, above the second layer, stores information corresponding to surface finish present in the scene.

5. The device of claim 1, wherein the operations are configured such that augmenting the point cloud representation of the scene comprises filling in or fixing at least one hole in the point cloud.

6. The device of claim 1, wherein the operations are configured such that retrieving the data representing the scene comprises:
   wirelessly connecting to a server; and
   retrieving the data representing the scene from a non-transitory data storage device communicatively coupled to the server.

7. The device of claim 1, wherein the operations further comprise forming a first image of the scene from the augmented point cloud.

8. The device of claim 7, further comprising a display; wherein the operations further comprise displaying the first image of the scene on the display.

9. The device of claim 8, wherein the operations further comprise forming a second image of the scene from the augmented point cloud, the second image having a different point of view from the first image.

10. The device of claim 9, wherein the operations further comprise displaying the second image of the scene on the display.

11. The device of claim 8, wherein the device is a mobile device.

12. The device of claim 1, further comprising a left display and a right display, wherein the device is a wearable headset; and
    wherein the operations further comprise:
       simultaneously generating a left image of the scene and a right image of the scene, the left and right images having respective points of view separated by an interpupillary distance;

displaying the left image of the scene on the left display; and displaying the right image of the scene on the right display.

13. A method, comprising:

wirelessly connecting to a server, the server storing data representing a scene, the server storing the data in multiple layers, each layer including a different category of data from the other layers, the categories of data increasing in complexity and specificity from a lowermost layer to an uppermost layer;

retrieving, from the server, at least a portion of the data representing the scene; and augmenting a point cloud representation of the scene in response to the retrieved data.

14. The method of claim 13, further comprising:

forming a first image of the scene from the augmented point cloud; and displaying the first image of the scene on a display.

15. The method of claim 14, further comprising:

forming a second image of the scene from the augmented point cloud, the second image having a different point of view from the first image; and displaying the second image of the scene on the display.

16. The method of claim 13, further comprising:

simultaneously generating a left image of the scene and a right image of the scene, the left and right images having respective points of view separated by an interpupillary distance;

displaying the left image of the scene on a left display; and displaying the right image of the scene on a right display.

17. The method of claim 13, wherein:

the lowermost layer is a first layer, the first layer storing information corresponding to edges present in the scene;

a second layer, above the first layer, stores information corresponding to corners present in the scene; and a third layer, above the second layer, stores information corresponding to surface finish present in the scene.

18. A non-transitory machine-readable medium comprising instructions that, when executed by one or more processors of a machine, cause the machine to perform operations comprising:

retrieving data representing a scene from multiple layers, each layer including a different category of data from the other layers, the categories of data increasing in complexity and specificity from a lowermost layer to an uppermost layer; and augmenting a point cloud representation of the scene in response to the retrieved data.

19. The non-transitory machine-readable medium of claim 18, wherein:

the lowermost layer is a first layer, the first layer storing information corresponding to edges present in the scene;

a second layer, above the first layer, stores information corresponding to corners present in the scene; and a third layer, above the second layer, stores information corresponding to surface finish present in the scene.

* * * * *